United States Patent [19]

Stultz et al.

[11] Patent Number: 5,652,756
[45] Date of Patent: Jul. 29, 1997

[54] GLASS FIBER LASER SYSTEM USING U-DOPED CRYSTAL Q-SWITCH

[75] Inventors: Robert D. Stultz, Bellflower; Hans W. Bruesselbach, Calabasas; David S. Sumida, Los Angeles; Milton Birnbaum, Rancho Palo Verdes, all of Calif.; Marly B. Camargo, Sao Paulo, Brazil

[73] Assignee: Hughes Electronics, Los Angeles, Calif.

[21] Appl. No.: 589,807

[22] Filed: Jan. 22, 1996

Related U.S. Application Data

[63] Continuation-in-part of Ser. No. 375,753, Jan. 20, 1995, Pat. No. 5,557,624.

[51] Int. Cl.$^6$ .................................................. H01S 3/11
[52] U.S. Cl. .............................. 372/10; 372/6; 372/40; 372/11
[58] Field of Search .......................... 372/6, 10, 11, 372/25, 40–42, 98, 99

[56] References Cited

U.S. PATENT DOCUMENTS

| | | | |
|---|---|---|---|
| 3,754,190 | 8/1973 | Cross | 372/11 |
| 4,682,336 | 7/1987 | Hendrix et al. | 372/10 |
| 5,422,899 | 6/1995 | Freiberg et al. | 372/25 |
| 5,557,624 | 9/1996 | Stultz et al. | 372/11 |

OTHER PUBLICATIONS

Stultz et al, "U(4+):SrF2 Efficient Saturable Absorber Q Switch for the 1.54 μm Erbium:Glass Laser", Applied Physic Letters, vol. 64, No. 8, Feb. 1994, pp. 948–950.

*Primary Examiner*—John D. Lee
*Attorney, Agent, or Firm*—Georgann Grunebach; Mary E. Lachman; Wanda K. Denson-Low

[57] ABSTRACT

A glass fiber laser system includes a laser resonator cavity having a resonant path and an erbium-doped glass fiber lasing element with an output of from about 1.5 to about 1.6 micrometers within the laser resonator cavity. A light source directed into an input end of the glass fiber lasing element optically pumps the lasing element to emit light. A passive Q-switch lies along the resonant path within the laser resonator cavity. The Q-switch is formed of a host material having a concentration of uranium ions therein, so as to be a saturable absorber of the light emitted by the lasing element. The Q-switch is preferably a uranium-doped fluoride crystal such as $U:CaF_2$, $U:SrF_2$, or $U:BaF_2$.

15 Claims, 2 Drawing Sheets

GLASS FIBER LASER SYSTEM USING U-DOPED CRYSTAL Q-SWITCH

This application is a continuation-in-part of application Ser. No. 08/375,753, filed Jan. 20, 1995, now U.S. Pat. No. 5,557,624.

BACKGROUND OF THE INVENTION

This invention relates to a laser system, and, more particularly, to a laser system using a glass fiber lasing element operating with a passive Q-switch.

A laser is a device that emits a spatially coherent beam of light of a specific wavelength. In a laser, a lasing element is placed within a laser resonator cavity and pumped with an energy source. The lasing element may be a crystal or, for the case of a doped glass host material, a glass fiber. The pumping action produces stored energy and gain within the lasing element. When the gain exceeds the losses so that there is a net light amplification per round trip of the light in the resonator cavity, laser light begins to build up in the cavity, and stored energy is extracted from the lasing element. This energy can be released in the form of a very short, intense light pulse by using a device called a Q-switch.

A Q-switch operates by initially increasing the cavity losses, thus preventing lasing action, while an amount of stored energy and gain is achieved that greatly exceeds the losses that would otherwise exist. The Q-switch losses are then quickly lowered, producing a large net amplification in the cavity, and an extremely rapid buildup of laser light occurs. The light pulse begins to decay after the stored energy in the lasing element has been depleted such that the gain once again drops below the cavity losses.

The Q-switch can be an active device which is controlled or driven by an external signal. The Q-switch can also be a passive structure that has no external control, but instead operates periodically as a result of its own properties. The present invention relates to a laser system using such a passive Q-switch.

A saturable absorber can be used as a passive Q-switch. The saturable absorber is a crystal having transmittance properties that vary as a function of the intensity of the incident light that falls upon the crystal. When light of low intensity is incident upon the saturable absorber, its light transmittance is relatively low, resulting in high cavity losses. As the incident light energy increases due to the buildup of energy within the laser resonator cavity, the light transmittance of the crystal increases. At some point, the light transmittance increases to a level such that the crystal "bleaches", i.e., becomes transparent, so that the cavity losses become low, and an intense Q-switched light pulse is emitted.

The properties of a saturable absorber crystal depend upon the wavelength of the incident light. A crystal which performs as a saturable absorber at one wavelength typically will not perform in the same manner at significantly different wavelengths. Further, a crystal may act as a saturable absorber for relatively low incident intensities, but higher intensities may damage the crystal. There is therefore an ongoing search for effective saturable absorber crystals for use as Q-switches in particular wavelength ranges.

One of the laser operating ranges of interest is at about 1.5–1.6 micrometers wavelength. This wavelength range is of particular importance because light in this range will not damage the human eye at moderate intensities. For example, the Er:glass laser emits light at about 1.53 micrometers wavelength, and can be used as an eye-safe laser. (In this accepted notation, A:B indicates a material having an ion of A doped into a B host material.) In the past, Q-switching of the Er:glass laser has been accomplished by an active, rotating prism Q-switch.

There is a need for saturable absorbers operable in the 1.5–1.6 micrometer wavelength range for use as passive Q-switches resistant to damage from the passage therethrough of a high-intensity laser beam. The present invention fulfills this need, and further provides related advantages.

SUMMARY OF THE INVENTION

The present invention provides a glass fiber laser system having a passive Q-switch. The Q-switch is operable over a range of wavelengths at about 1.5–1.6 micrometers. The glass fiber laser system with the passive Q-switch of the invention operates at high pulse repetition rates due to its large surface-to-volume ratio and consequent large heat-dissipation.

In accordance with the invention, a laser system comprises a laser resonator cavity having a resonant path, and an erbium-doped glass fiber lasing element lying along the resonant path. The glass fiber lasing element has an input end and an output end. The glass fiber lasing element produces a lasing element output light beam. The laser system further includes means for optically pumping the glass fiber lasing dement, and a Q-switch lying along the resonant path within the laser resonator cavity. The Q-switch comprises a host material having uranium ions doped therein. The host material is preferably a fluoride crystal such as calcium fluoride, strontium fluoride, or barium fluoride. The erbium-doped glass fiber lasing element emits light at about 1.5–1.6 micrometers, typically at about 1.53 micrometers, and the uranium-doped Q-switch is a saturable absorber over this range.

The laser resonator cavity preferably includes an input mirror at an input end of the glass fiber lasing element. The input mirror has a high reflectivity for light of the wavelength of the lasing element output light beam and a high transmittance for light of the optical pump. There is an outcoupler mirror at the output end of the glass fiber lasing dement. The outcoupler mirror has a lower reflectivity for light of the wavelength of the lasing dement output light beam than the input mirror. The Q-switch is positioned along the resonant path, either at the output end or the input end of the glass fiber lasing element, or, in some eases, integrally with the lasing dement. In one embodiment, the input mirror is a flat mirror having a reflectivity of substantially 100 percent at a wavelength of about 1.5–1.6 micrometers, and the outcoupler mirror is a curved mirror having a reflectivity of less than 100 percent at a wavelength of about 1.5–1.6 micrometers.

The means for optically pumping may be any operable optical pump for the lasing dement. For example, the means for optically pumping may comprise a laser light pump or a diode array laser, and a lens positioned between the light source and the end of the optical fiber lasing element. The lens is selected to focus a pumping light beam from the light source into the end of the optical fiber lasing element.

The laser system of the invention provides a laser having a pulse high repetition rate in the form of a glass fiber lasing element. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
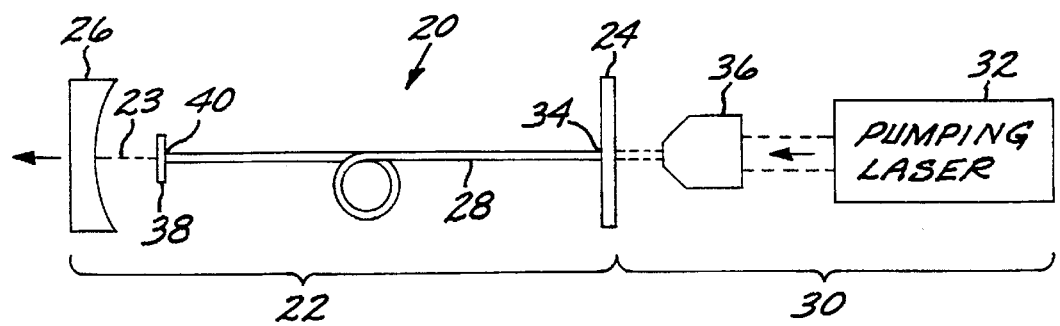
FIG. 1 is a schematic drawing of a glass fiber laser system according to the invention.

FIG. 1 schematically illustrates a laser system 20 according to the present invention. The laser system 20 includes a laser resonator cavity 22 having a resonant path 23 therein. The resonant path 23 defines the path that light follows within the resonator cavity 22, which may be a straight line but need not be a straight line because the lasing element may be nonlinear. At a first end of the cavity 22 and lying along the resonant path 23 is a flat input mirror 24, which has a high reflectivity, preferably substantially 100 percent, for light at about the wavelength of the output of the laser system (from about 1.5 to about 1.6 micrometers). The input mirror 24 has a high transmittance for light at about the wavelength used to excite the lasing element of the laser system. Equivalently, the input mirror may be an intra-core fiber Bragg grating fabricated within the core of the glass fiber. At a second end of the cavity 22 and lying along the resonant path 23 is a curved outcoupler mirror 26 having a reflectivity that is less than 100 percent, for light at about the wavelength of the output of the laser system. In some cases, the outcoupler mirror 26 may also be an intra-core Bragg grating fabricated within the core of the glass fiber.

A lasing element 28 is positioned within the laser resonator cavity 22 along the resonant path 23. The lasing element 28 is in the form of a doped glass fiber. The glass fiber lasing element 28 is typically of about 75 micrometers core diameter and of a length quite long compared to its diameter. The glass fiber lasing element is formed of a glass, such as a silica glass or a phosphate glass, doped with erbium. When stimulated, the lasing element 28 emits coherent light having a wavelength in a range at about 1.5 micrometers, and more specifically from about 1.5 to about 1.6 micrometers. The exact wavelength of the coherent light depends upon the nature of the glass and other factors, and may, to some extent, be tuned within the wavelength range of 1.5 to 1.6 micrometers.

The lasing element 28 may optionally be co-doped with a sensitizer ion such as ytterbium to aid in absorbing pumping light energy and efficiently transferring that energy to the erbium lasing ion. In most instances, co-doping with a sensitizer ion is not necessary due to the large length of the glass fiber lasing element and the desire to absorb the pumping light energy throughout the length of the glass fiber lasing element. The lasing element may also optionally be co-doped with uranium so that the lasing element 28 itself is self-Q-switched, in a manner comparable with the Q-switch discussed subsequently. In that case, the mirrors 24 and 26 may be made integral with the lasing element 28 using a Bragg grating mirror at each end of the core of the glass fiber lasing element. In this case, the lasing element, mirrors, and Q-switch are contained in a single unit that is relatively rugged and without alignment problems.

The erbium dopant in the glass fiber lasing element is typically present in a concentration of from about $10^{17}$ to about $10^{20}$ per cubic centimeter, the sensitizer dopant (where present) is typically present in a concentration of from about $10^{20}$ to about $10^{21}$ per cubic centimeter, and the uranium dopant (where present) is typically present in a concentration of from about $10^{17}$ to about $10^{20}$ per cubic centimeter. The concentrations of the dopants are typically varied according to the length of the glass fiber, with higher concentrations being used in shorter glass fibers.

A means 30 for optically pumping the glass fiber lasing element 28 is provided. This means 30 preferably includes a pumping laser 32 such as a continuous wave laser or a diode array laser. An operable continuous wave laser is a Ti:Al$_2$O$_3$ (Ti:sapphire) laser operating in the 970 nanometer absorption band at 979 nanometers, and an operable diode array laser is an indium-gallium-arsenide diode array laser operating in the 970 nanometer absorption band. In the illustrated embodiment, the output beam of the pumping laser 32 is focused by a lens 36 onto an input end 34 of the glass fiber lasing element 28. Equivalently, the output beam of the pumping laser 32 may be focused by the lens onto the output end 40 of the lasing element 28. In either event, the efficiency of energy transfer from the output beam of the pumping laser into the glass fiber lasing element 28 may be increased by coating the mirror at the end of the glass fiber lasing element remote from the pumping laser input with a coating that is highly reflective at the wavelength of the pumping laser, so that the output beam of the pumping laser makes two passes through the length of the glass fiber lasing element.

A Q-switch 38 is positioned within the laser resonator cavity 22 along the resonant path 23 between the mirrors 24 and 26. In FIG. 1, the Q-switch is illustrated as being between an output end 40 of the glass fiber lasing element 28 and the curved outcoupler mirror 30. Equivalently, the Q-switch may be positioned between the input end 34 of the lasing element 28 and the input mirror 24, because the preferred U:fluoride Q-switch is relatively transparent to the pumping light produced by the pumping laser 32. The Q-switch may also be made integral with the lasing element, by co-doping uranium with the erbium into the glass fiber in the manner discussed previously. The Q-switch 38 is a saturable absorber of light in the wavelength range at about 1.5 micrometers, and more specifically from about 1.5 to about 1.6 micrometers.

The elements 32, 36, 24, 38, and 26 are depicted in FIG. 1 as lying on a straight line, so that the resonant path 23 is a straight line. This need not be the case, as the glass fiber lasing element 28 may be arranged into a nonlinear shape. It is only required that the light energy from the pumping laser 32 be coupled into the input end 34 of the glass fiber lasing element 28 and that the laser light output of the glass fiber lasing element 28 be extracted from the output end 40 of the glass fiber lasing element 28, and through the Q-switch crystal 38 and the outcoupler mirror 26.

Figure 2:
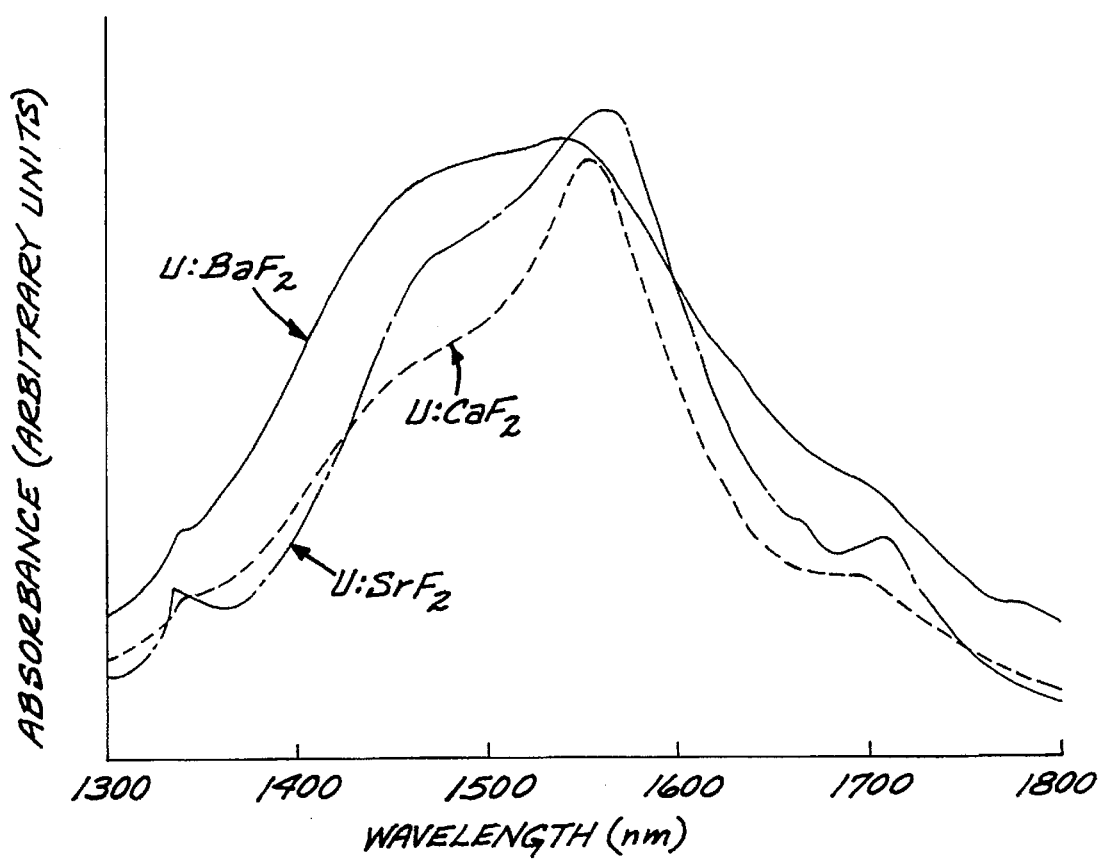
FIG. 2 is a graph of the absorption spectrum of uranium doped into barium fluoride, calcium fluoride, and strontium fluoride host crystals in the wavelength range of interest.

The Q-switch 38 is formed of a host material with a sufficient concentration of uranium ions, preferably uranium ions, therein to act as a saturable absorber in the wavelength range of from about 1.5 to about 1.6 micrometers, as shown in FIG. 2. The concentration of the uranium dopant in the host material is preferably from about $10^{18}$ to about $10^{20}$ per cubic centimeter. The Q-switch material desirably has a higher absorption cross section, preferably a much higher absorption cross section, than the stimulated emission cross section of the lasing element 34.

The host material of the Q-switch 38 is preferably a crystal of a fluoride salt. Most preferably, the host material is one of the di-fluorides such as calcium fluoride ($CaF_2$), strontium fluoride ($SrF_2$), or barium fluoride ($BaF_2$). Of these hosts, $CaF_2$ and $SrF_2$ are particularly favored because the uranium absorption cross section is higher in these hosts than in $BaF_2$, and the damage threshold and hardness of these hosts is higher than for $BaF_2$. The crystal structure of these fluorides is the cubic fluorite structure.

The preferred Q-switch in crystal form can therefore be described as uranium-doped calcium fluoride (U:$CaF_2$), uranium-doped strontium fluoride (U:$SrF_2$), and uranium-doped barium fluoride (U:$BaF_2$). (Some authorities have described the active uranium ion as $U^{2+}$, while more recently, it has been suggested that the active uranium ion is $U^{4+}$. For the present purposes this debate is not pertinent, as it is only necessary that the U-doped crystals exhibit an absorption spectrum of the general type shown in FIG. 2, wherein there is a significant absorption cross section in the 1.5–1.6 micrometer range).

A laser system 20 like that of FIG. 1 was built and operated to demonstrate the performance of the Q-switched glass fiber laser system. The glass fiber lasing element 28 was 63 centimeters long and with a core diameter of 75 micrometers. The glass fiber was fused silica doped with erbium in a concentration of $2.1 \times 10^{19}$ $cm^{-}$. The glass fiber lasing element was purchased from National Optics Institute of Canada, Saint-Foy, Quebec, Canada. This lasing element lases in the range of about 1.5–1.6 micrometers output light wavelength. The pumping laser 32 was a continuous wave Ti:sapphire laser tuned to an output light wavelength of 979 nanometers, purchased from Schwartz Electrooptics. The lens 36 was a microscope objective lens that focused the light output of the laser 32 onto the input end 34 of the lasing element 28. The flat input mirror 24 was coated with a multilayer dielectric coating to achieve a high reflectance at the output wavelength of the lasing element 28, about 1.5 micrometers. The input mirror was coated to achieve a high transmittance at the wavelength of the pumping laser, 979 nanometers. The outcoupler mirror 26 had a concave radius of curvature of 2.5 centimeters on the side facing the output end 40 of the glass fiber lasing element 28, and was spaced 2.5 centimeters from the output end of the glass fiber lasing element.

Two different Q-switch crystals 38 were tested: a 1 millimeter thick U:$SrF_2$ crystal having an unbleached internal transmittance of 89 percent at 1.533 micrometers, and a 1.3 millimeter thick U:$CaF_2$ crystal having an unbleached internal transmittance of 80 percent at 1.533 micrometers.

Figure 3:
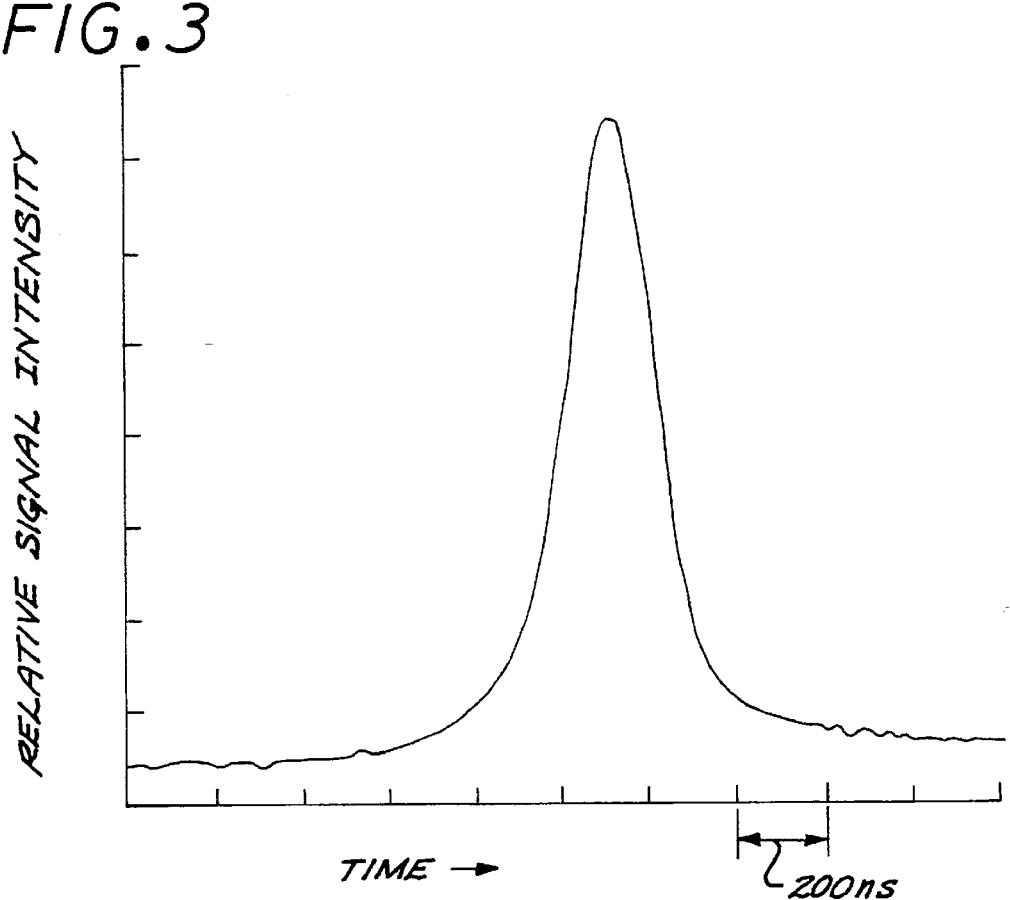
FIG. 3 is a graph of relative signal intensity as a function of time for a single pulse output of the glass fiber laser system.
Figure 4:
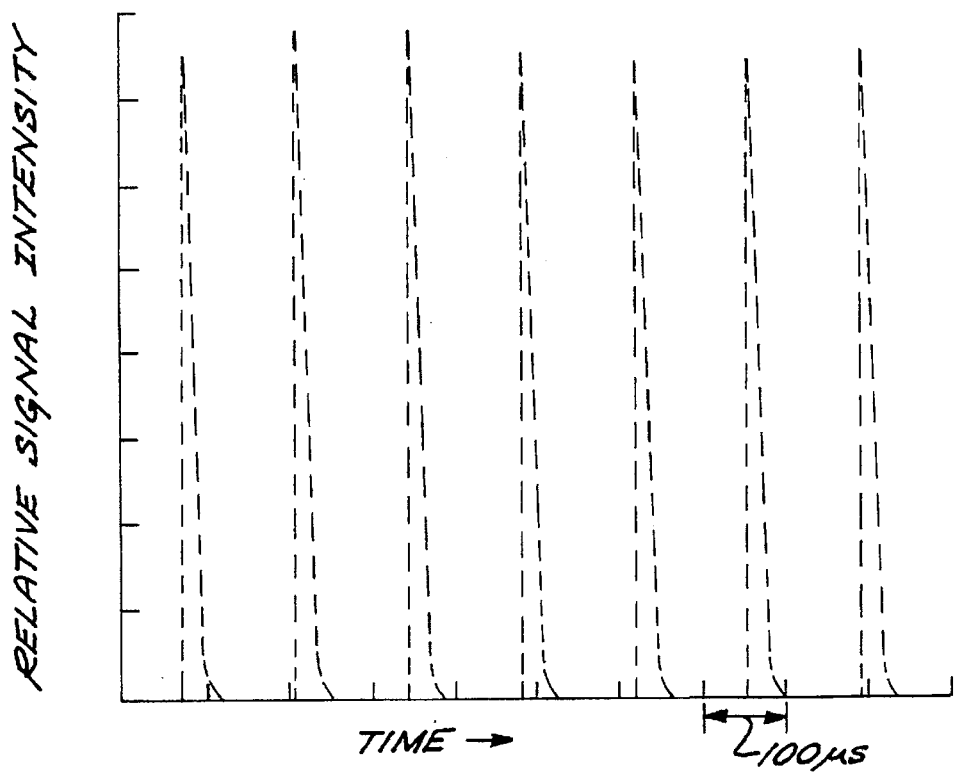
FIG. 4 is a graph of relative signal intensity as a function of time for the pulse train output of the glass fiber laser system.

The output of the laser system was a train of repetitively Q-switched pulses. As shown in FIG. 3, 20 microjoule pulses with 200 nanosecond full-width at half-maximum were obtained. The repetition rate was about 1 kilohertz with an outcoupler mirror reflectivity of about 85 percent. Other outcoupler mirror reflectivities of 65 to 95 percent also produced Q-switching. An example of a Q-switched pulse train, with a repetition rate of greater than 7 kilohertz, is shown in FIG. 4. The full-width and half-maximum for the individual pulses in this case was about 3.5 microseconds. The pulse energy, width, and repetition rate of the laser system illustrated in FIG. 1 may be varied by translating the Q-switch crystal 38 to positions closer and farther from the output end 34.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A laser system, comprising:
    a laser resonator cavity having a resonant path;
    an erbium-doped glass fiber lasing element lying along the resonant path, the glass fiber having an input end and an output end and producing a lasing element output light beam;
    means for optically pumping the glass fiber lasing element, the means having a pumping light beam; and
    a Q-switch lying along the resonant path within the laser resonator cavity, the Q-switch comprising a host material having uranium ions doped therein.

2. The laser system of claim 1, wherein the laser resonator cavity comprises
    an input mirror at the input end of the glass fiber lasing element, the input mirror having a high reflectivity for light of the wavelength of the lasing element output light beam and a high transmittance for light at the wavelength of the pumping light beam; and
    an outcoupler mirror at the output end of the glass fiber lasing element, the outcoupler mirror having a lower reflectivity for light of the wavelength of the lasing element output light beam than the input mirror.

3. The laser system of claim 1, wherein the means for optically pumping comprises
    a light source; and
    a lens positioned between the light source and the input end of the glass fiber lasing element, the lens being selected to focus a pumping light beam from the light source into the input end of the glass fiber lasing element.

4. The laser system of claim 1, wherein the means for optically pumping includes
    a pumping laser light source.

5. The laser system of claim 1, wherein the Q-switch comprises a host material selected from the group consisting of a fluoride crystal and glass.

6. The laser system of claim 1, wherein the Q-switch comprises a crystal of a fluoride host material selected from the group consisting of calcium fluoride, strontium fluoride, and barium fluoride.

7. A laser system, comprising:
    a laser resonator cavity having a resonant path, the laser resonator cavity comprising
        an input mirror at a first end of the laser resonator cavity and lying on the resonant path, the input mirror having a reflectivity of substantially 100 percent at a wavelength of from about 1.5 to about 1.6 micrometers, and
        an outcoupler mirror at a second end of the laser resonator cavity and lying on the resonant path, the outcoupler mirror having a reflectivity of less than 100 percent at a wavelength of from about 1.5 to about 1.6 micrometers;
    an erbium-doped glass fiber lasing element lying along the resonant path within the laser resonator cavity, the glass fiber having an input end and an output end;
    an optical pump, comprising
        a light source having a pumping light beam output, and
        a converging lens positioned between the light source and the input mirror, the lens being selected to focus the pumping light beam from the light source into the input end of the glass fiber lasing element; and
    a Q-switch lying along the resonant path within the laser resonator cavity, the Q-switch comprising a host material having uranium ions doped therein.

8. The laser system of claim 7, wherein the Q-switch comprises a host material selected from the group consisting of a fluoride crystal and glass.

9. The laser system of claim 7, wherein the Q-switch comprises a crystal of a fluoride host material selected from the group consisting of doped calcium fluoride, strontium fluoride, and barium fluoride.

10. The laser system of claim 7, wherein the input mirror is a flat mirror and the outcoupler mirror is a curved mirror.

11. The laser system of claim 7, wherein the light source comprises a pumping laser light source.

12. A laser system, comprising:

a laser resonator cavity having a resonant path;

a glass fiber lasing element lying along the resonant path within the laser resonator cavity, the glass fiber lasing element emitting, under stimulation, light at a wavelength of from about 1.5 to about 1.6 micrometers, the glass fiber having an input end and an output end;

means for optically pumping the glass fiber lasing element; and a Q-switch lying along the resonant path within the laser resonator cavity, the Q-switch comprising a host material having uranium ions doped therein and being a saturable absorber of light of a wavelength of from about 1.5 to about 1.6 micrometers.

13. The laser system of claim 12, wherein the Q-switch comprises a saturable absorber selected from the group consisting of U-doped calcium fluoride, U-doped strontium fluoride, and U-doped barium fluoride.

14. The laser system of claim 12, wherein the means for optically pumping comprises a light source; and a lens positioned between the light source and the input end of the glass fiber lasing element, the lens being selected to focus a pumping light beam from the light source into the input end of the glass fiber lasing element.

15. The laser system of claim 14, wherein the light source comprises a pumping laser light source.

* * * * *